(12) United States Patent
Hirsch et al.

(10) Patent No.: US 12,264,884 B2
(45) Date of Patent: Apr. 1, 2025

(54) METHOD FOR PROVIDING A HEAT EXCHANGER BLOCK WITH A HOUSING AS WELL AS HEAT EXCHANGER BLOCK HAVING SUCH A HOUSING

(71) Applicant: Zehnder Group International AG, Graenichen (CH)

(72) Inventors: Christian Hirsch, Eibenstock (DE); Frank Sabaczuk, Zwickau (DE)

(73) Assignee: ZEHNDER GROUP INTERNATIONAL AG, Gränichen (CH)

( * ) Notice: Subject to any disclaimer, the term of this patent is extended or adjusted under 35 U.S.C. 154(b) by 939 days.

(21) Appl. No.: 17/289,716

(22) PCT Filed: Nov. 5, 2019

(86) PCT No.: PCT/IB2019/059471
§ 371 (c)(1),
(2) Date: Nov. 1, 2021

(87) PCT Pub. No.: WO2020/095188
PCT Pub. Date: May 14, 2020

(65) Prior Publication Data
US 2022/0221229 A1    Jul. 14, 2022

(30) Foreign Application Priority Data
Nov. 5, 2018   (CH) .................................. 01347/18

(51) Int. Cl.
*F28D 9/00*       (2006.01)
*B29C 65/00*      (2006.01)
(Continued)

(52) U.S. Cl.
CPC .......... *F28D 9/0037* (2013.01); *B29C 66/431* (2013.01); *B29C 66/71* (2013.01);
(Continued)

(58) Field of Classification Search
CPC ..... F28D 9/0037; F28F 9/001; F28F 2255/14; B23P 15/26; Y10T 29/49366; B29C 66/71; B29C 66/431
See application file for complete search history.

(56) References Cited

U.S. PATENT DOCUMENTS 4,099,928 A   7/1978  Norback
4,116,271 A   9/1978  De Lepeleire
(Continued)

FOREIGN PATENT DOCUMENTS

DE   10 2015 103 908 A1   9/2016
EP        0774637 A2       5/1997
(Continued)

OTHER PUBLICATIONS

International Search Report of Feb. 6, 2020 for PCT/IB2019/059471.
(Continued)

*Primary Examiner* — Jason L Vaughan
(74) *Attorney, Agent, or Firm* — Pauley Erickson & Swanson

(57) ABSTRACT

Method for providing a heat exchanger block (B) with a housing (H), said heat exchanger block (B) comprising at least a first outer surface region (B1) and a second outer surface region (B2) opposite said first outer surface region (B1), said housing (H) comprising at least a first housing portion (W1) covering/engaging said first outer surface region (B1) of said heat exchanger block (B) and a second housing portion (W2) opposite said first housing portion (W1) and covering/engaging said second outer surface region (B2) of said heat exchanger block (B), said method comprising at least the following steps: a) moulding said first housing portion (W1) to said first outer surface region
(Continued)

(B1); and b) moulding said second housing portion (W2) to said second outer surface region (B2).

15 Claims, 7 Drawing Sheets

(51) Int. Cl.
  *B29K 101/12* (2006.01)
  *B29L 31/18* (2006.01)
  *F28F 9/00* (2006.01)
(52) U.S. Cl.
  CPC .......... *F28F 9/001* (2013.01); *B29K 2101/12* (2013.01); *B29L 2031/18* (2013.01); *F28F 2255/14* (2013.01)

(56) References Cited

U.S. PATENT DOCUMENTS

| | | |
|---|---|---|
| 4,984,630 A | 1/1991 | Gemeinhardt et al. |
| 6,660,198 B1 | 12/2003 | Fischer |
| 2006/0201666 A1 | 9/2006 | Sonoda et al. |
| 2007/0107221 A1 | 5/2007 | Veltkamp |
| 2008/0201948 A1 | 8/2008 | Ludwig |
| 2008/0201977 A1 | 8/2008 | Song |
| 2017/0077568 A1 | 3/2017 | Huettel |

FOREIGN PATENT DOCUMENTS

| | | |
|---|---|---|
| EP | 1 779 965 A2 | 5/2007 |
| EP | 3338981 A1 | 6/2018 |
| EP | 2 951 523 B1 | 10/2018 |
| JP | 5-248782 A | 9/1993 |
| JP | 2004009813 A | 1/2004 |

OTHER PUBLICATIONS

EPO (Munich, DE), EPO Form 2001 10.24 CXP, "Communication pursuant to Article 94(3) EPC," and EPO Form 2906 01.91TRI, Exam Opinion /Reasons, for European Application No. EP 19 817 810.5 mailed date of Nov. 5, 2024, (5 pages total).

Canadian Patent Office (Quebec), Office Action for Canadian Application No. 3,112,900, issued Nov. 8, 2024 (4 pages).

METHOD FOR PROVIDING A HEAT EXCHANGER BLOCK WITH A HOUSING AS WELL AS HEAT EXCHANGER BLOCK HAVING SUCH A HOUSING

The invention relates to a method for providing a heat exchanger block with a housing and to a heat exchanger comprising a heat exchanger block with a housing manufactured by said method.

It is known to manufacture a heat exchanger block and a housing or housing parts of such a heat exchanger block separately and then put the heat exchanger block and the housing or housing parts together in an assembly operation.

This type of assembly does not guarantee a strong and hermetic connection between the heat exchanger block and the housing. In order to provide a strong and hermetic connection between the heat exchanger block and the housing, it is known to use elastomeric seals and/or glue. However, this complicates the method for providing a heat exchanger block with a housing.

It is an object of the invention to simplify a method for providing a heat exchanger block with a housing.

Therefore, the invention provides a method for providing a heat exchanger block with a housing and to a heat exchanger comprising a heat exchanger block and a housing manufactured by said method.

In other words, the present invention provides a method for providing a heat exchanger block with a housing, said heat exchanger block comprising air flow passages for exchanging heat energy between a first air flow which can be passed through said heat exchanger block and a second air flow which can be passed through said heat exchanger block;

a first inlet opening fora first air flow;

a first outlet opening for said first air flow;

a second inlet opening for a second air flow; and a second outlet opening for said second air flow;

said method comprising:

selecting outer surface regions of said heat exchanger block to be covered by portions of said housing, said selected surface regions being different from said first inlet opening, said first outlet opening, said second inlet opening and said second outlet opening;

moulding a portion of said housing to each selected outer surface region.

BRIEF DESCRIPTION OF THE DRAWINGS

The following description and drawing show an exemplary embodiment of the present invention with a heat exchanger block and a method of providing a housing to said heat exchanger block in order to provide a heat exchanger comprising said heat exchanger block having said housing.

FIG. 1 is a perspective view of a heat exchanger block B according to the embodiment. The heat exchanger block B comprises a plurality of first air flow passages AFP1 (shown as solid lines) and a plurality of second air flow passages AFP2 (shown as interrupted lines) adjacent said plurality of first air flow passages for exchanging heat energy between a first air flow AF1 (shown as black arrows) passing through said plurality of first air flow passages AFP1 and a second air flow AF2 (shown as white arrows) passing through said plurality of second air flow passages AFP2.

The first air flow passages AFP1 are defined between a first pair of adjacent heat exchanger plates parallel to each other. Similarly, the second air flow passages AFP2 are defined between a second pair of adjacent heat exchanger plates parallel to each other. The heat exchanger block comprises N stacked plates and (N-1) consecutive pairs of adjacent heat exchanger plates in the stack, with each pair of adjacent heat exchanger plates alternatingly constituting first air flow passages AFP1 and second air flow passages AFP2.

The heat exchanger block B also comprises a first inlet opening region O11 having inlet openings for said first air flow AF1 and a first outlet opening region O12 having outlet openings for said first air flow AF1 as well as a second inlet opening region O21 having inlet openings for said second air flow AF2 and a second outlet opening region O22 having outlet openings for said second air flow AF2.

The heat exchanger block B comprises a first outer surface region B1 and a second outer surface region B2 opposite said first outer surface region B1, as well as a third outer surface region B3 and a fourth outer surface region B4 opposite said third outer surface region B3, as well as a fifth outer surface region B5 and a sixth outer surface region B6 opposite said fifth outer surface region B5.

Figure 1:
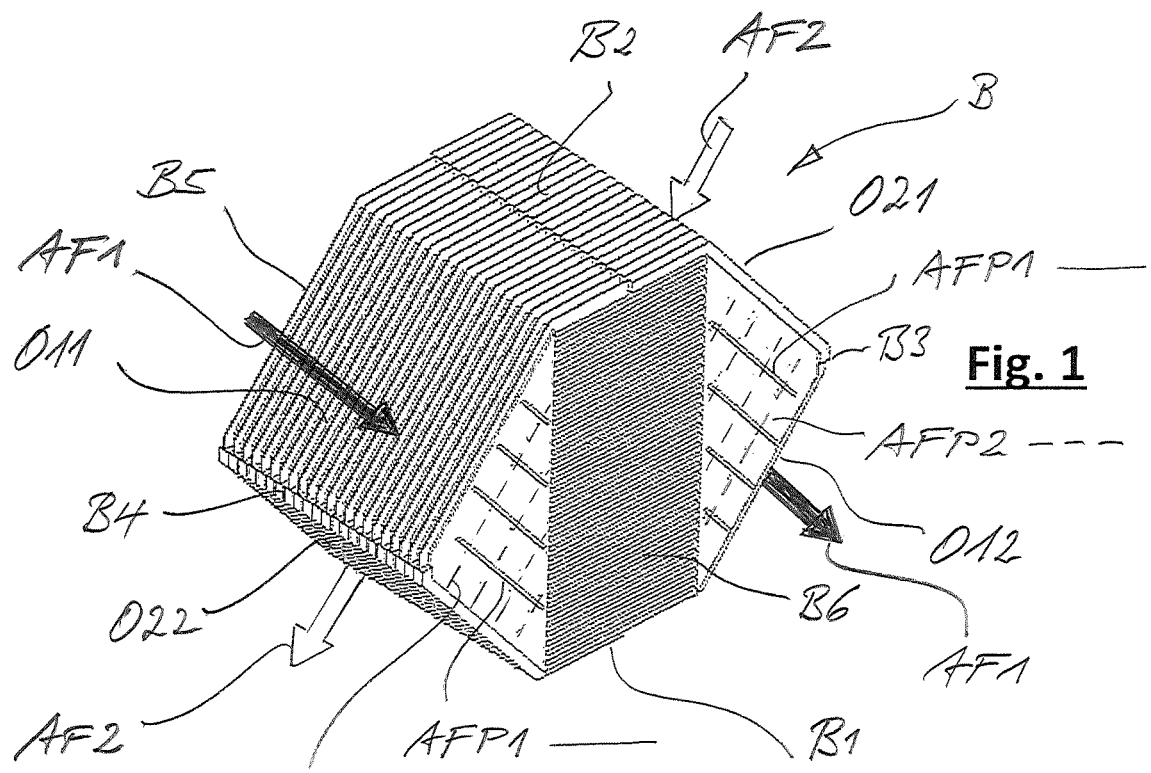
FIG. 1 is a perspective view of a heat exchanger block according to the embodiment.
Figure 2:
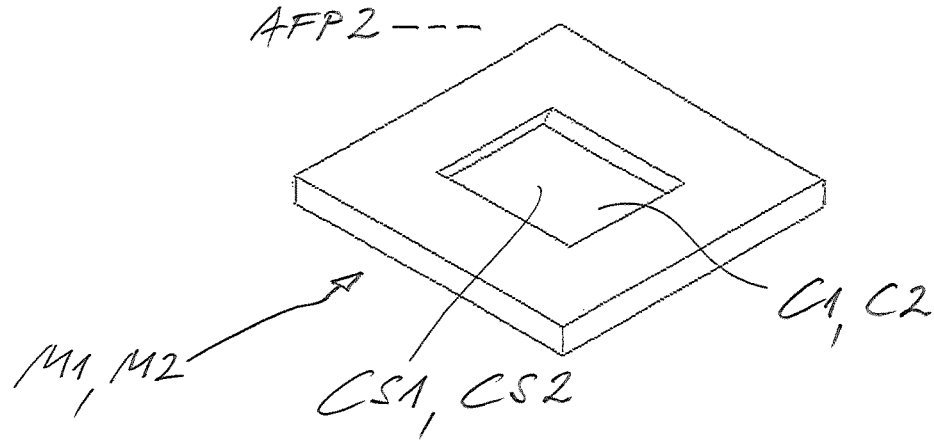
FIG. 2 is a perspective view of a mould to be used in the method according to the embodiment.

FIG. 2 is a perspective view of a first mould M1 or a second mould M2 to be used in the method according to the embodiment. The first and second moulds M1 and M2 have a first cavity C1 and a second cavity C2, respectively with an inner cavity surface CS1 and CS2, respectively. In the exemplary embodiment, the heat exchanger block B and the housing H moulded to it are symmetrical with the first outer surface region B1 and the second outer surface region B2 being symmetrical to each other.

Figure 3:
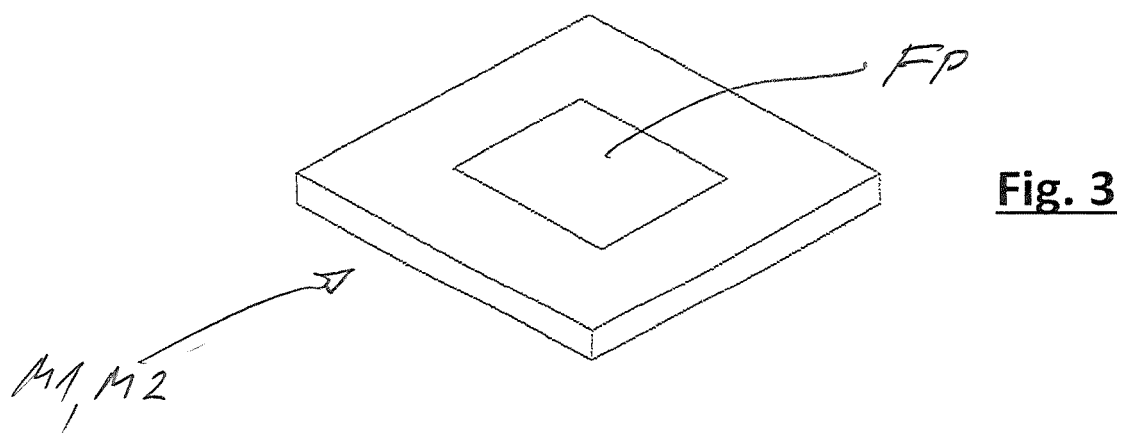
FIG. 3 shows the mould of FIG. 2 filled with a fluidic polymer.

FIG. 3 shows the moulds M1 and M2 of FIG. 2 partially filled with a fluidic polymer FP.

Figure 4:
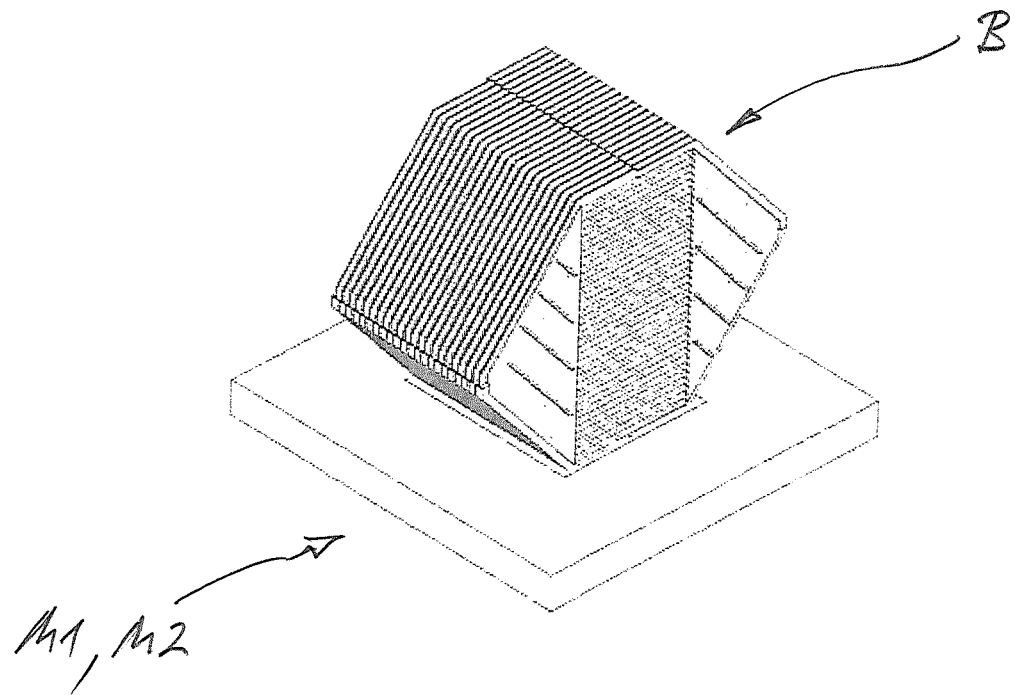
FIG. 4 shows a method step for providing said heat exchanger block with a housing portion.

FIG. 4 shows a method step for providing said heat exchanger block B with a first housing portion W1. This method step comprises inserting said first outer surface region B1 of said heat exchanger block B into said partially filled first cavity portion C1 by moving said heat exchanger block B towards said first mould M1, thereby displacing and spreading said fluidic polymer FP within a first gap region G1 between said first outer surface region B1 and said first inner cavity surface CS1. This method step further comprises transferring said fluidic polymer FP within said first gap region G1 from its fluidic state into a solid polymer SP with a solid state or less fluidic state than said fluidic polymer. This method step further comprises withdrawing said first outer surface region B1 of said heat exchanger block B from said partially filled first cavity portion C1 by moving said heat exchanger block B away from said first mould M1, thereby leaving said moulded first housing portion W1 covering/engaging said first outer surface region B1 of said heat exchanger block B.

Figure 5A:
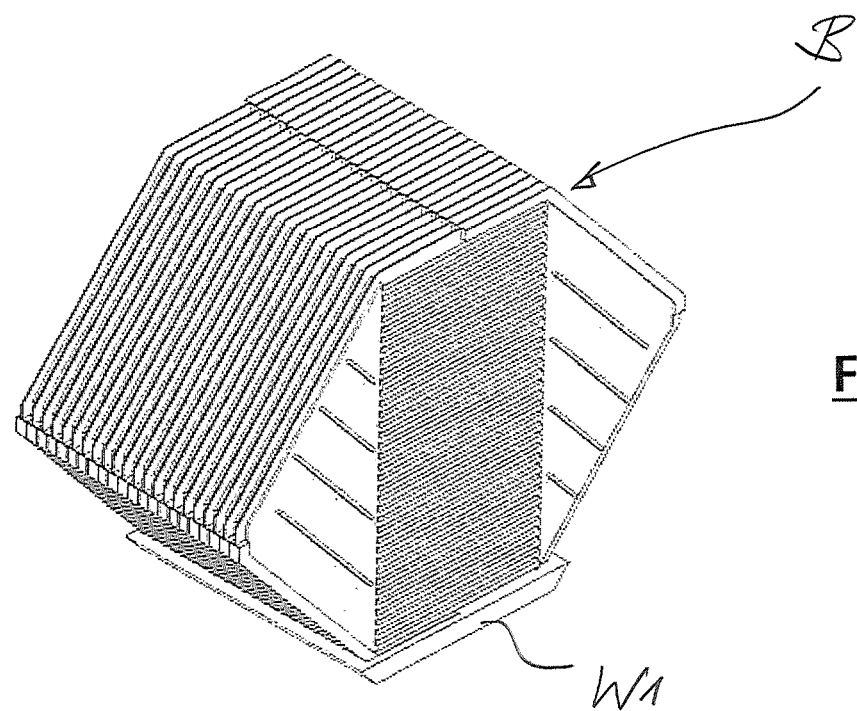
FIG. 5A is a perspective view of said heat exchanger block provided with one housing portion.

FIG. 5A is perspective view of said heat exchanger block B provided with said first housing portion W1 as result of the method step described in in the previous paragraph with respect to FIG. 4.

Figure 5B:
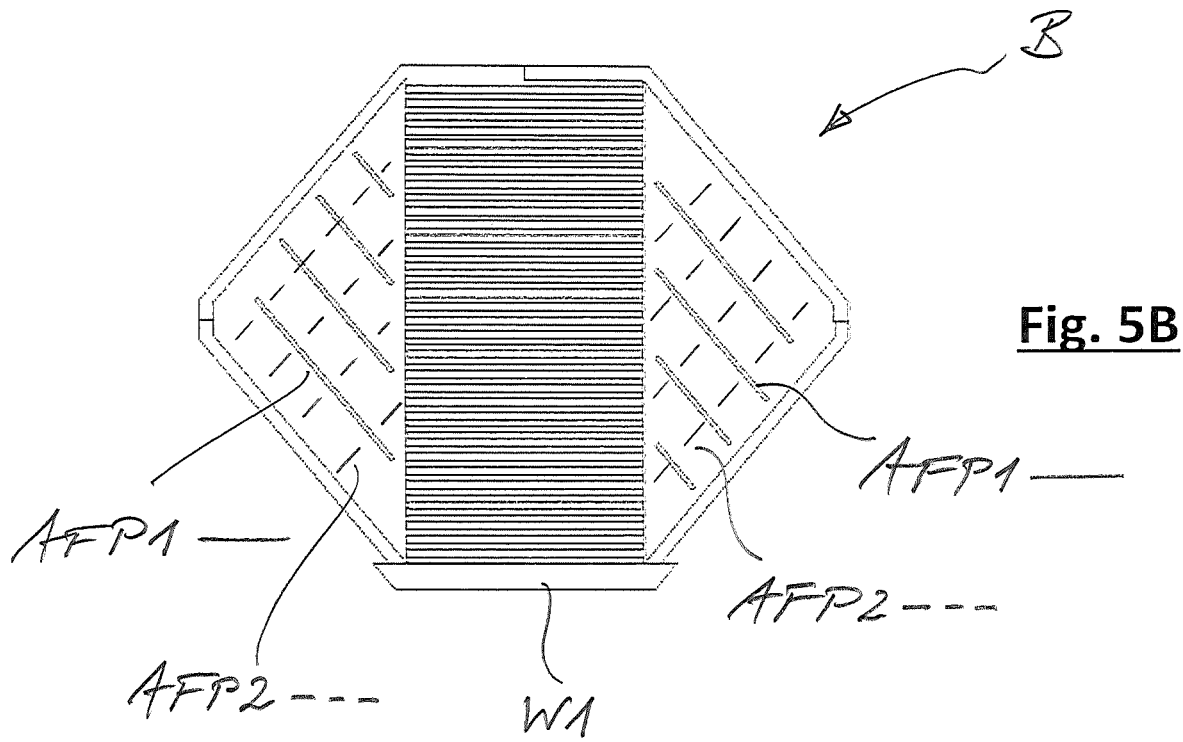
FIG. 5B is a side view of said heat exchanger block provided with said housing portion.

FIG. 5B is a side view of said heat exchanger block B provided with said first housing portion W1.

Figure 5C:
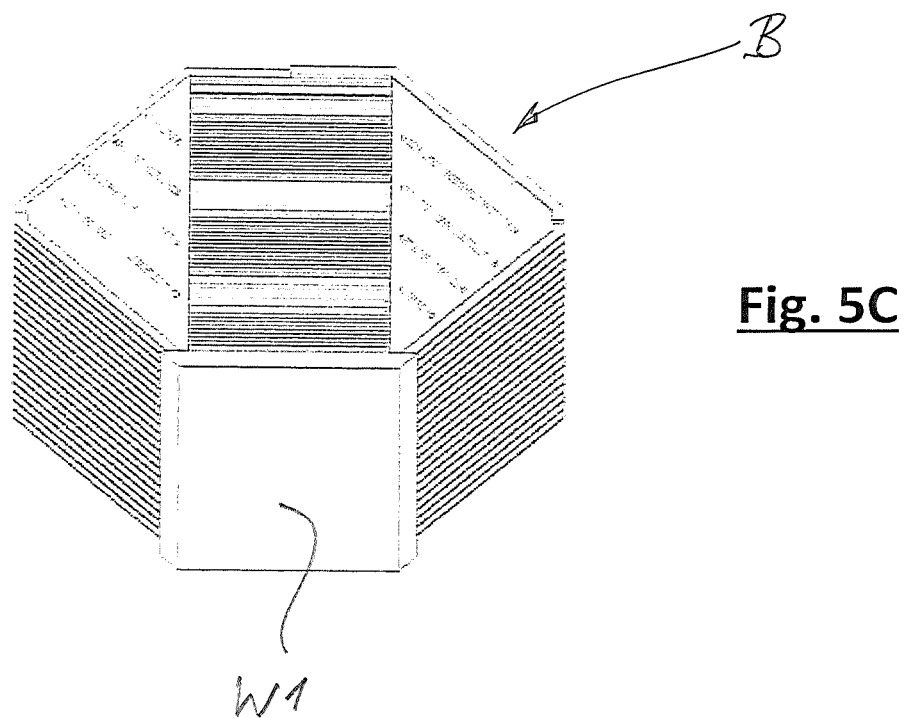
FIG. 5C is another perspective view of said heat exchanger block provided with said housing portion.

FIG. 5C is another perspective view of said heat exchanger block B provided with said first housing portion W1.

Analogously, there is provided a method step for providing said heat exchanger block B with a second housing portion W2 (not explicitly shown) This method step comprises inserting said second outer surface region B2 of said heat exchanger block B into said partially filled second cavity portion C2 by moving said heat exchanger block B towards said second mould M2, thereby displacing and spreading said fluidic polymer FP within a second gap region G2 between said second outer surface region B2 and said second inner cavity surface CS2. This method step further comprises transferring said fluidic polymer FP within said first gap region G2 from its fluidic state into a solid polymer SP with a solid state or less fluidic state than said fluidic polymer. This method step further comprises withdrawing said second outer surface region B2 of said heat exchanger block B from said partially filled second cavity portion C2 by moving said heat exchanger block B away from said second mould M2, thereby leaving said moulded second housing portion W2 covering/engaging said second outer surface region B2 of said heat exchanger block B.

Figure 6A:
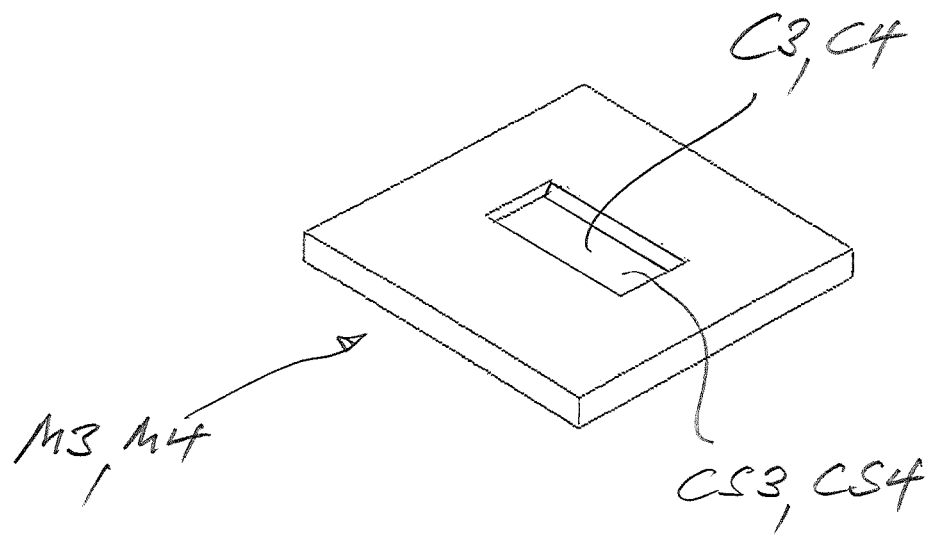
FIG. 6A is a perspective view of a mould to be used in the method according to the embodiment.

FIG. 6A is a perspective view of a third mould M3 and a fourth mould M4 to be used in the method according to the embodiment. The third and fourth moulds M3 and M4 have a third cavity C3 and a fourth cavity C4, respectively with a third inner cavity surface CS3 and a fourth inner cavity surface CS4, respectively. In the exemplary embodiment, the heat exchanger block B and the housing H moulded to it are symmetrical with the third outer surface region B3 and the fourth outer surface region B4 being symmetrical to each other.

Figure 6B:
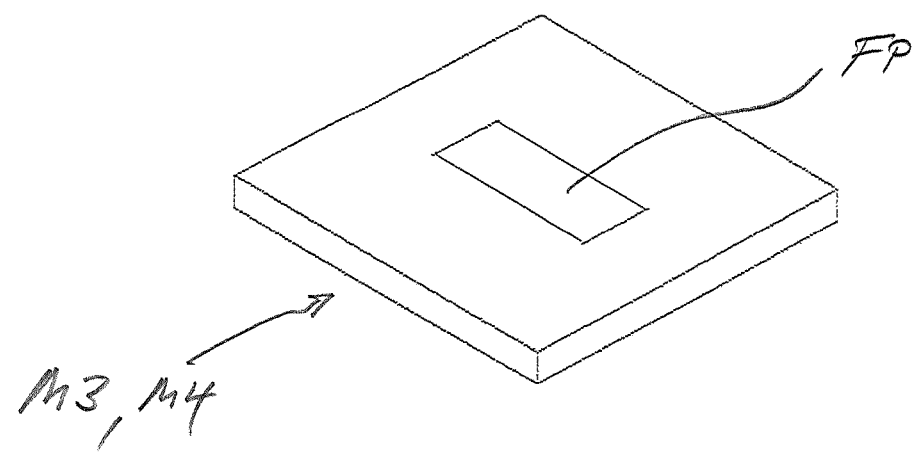
FIG. 6B shows the mould of FIG. 6A filled with a fluidic polymer.

FIG. 6B shows the moulds M3 and M4 of FIG. 6A partially filled with a fluidic polymer FP.

In a manner similar to the first mould M1 being used to mould the first housing portion W1 to the first outer surface region B1 and similar to the second mould M2 being used to mould the second housing portion W2 to the second outer surface region B2, the third mould M3 is used to mould a third housing portion W3 to the third outer surface region B3 and the fourth mould M4 is used to mould a forth housing portion W4 to the forth outer surface region B4.

Figure 7:
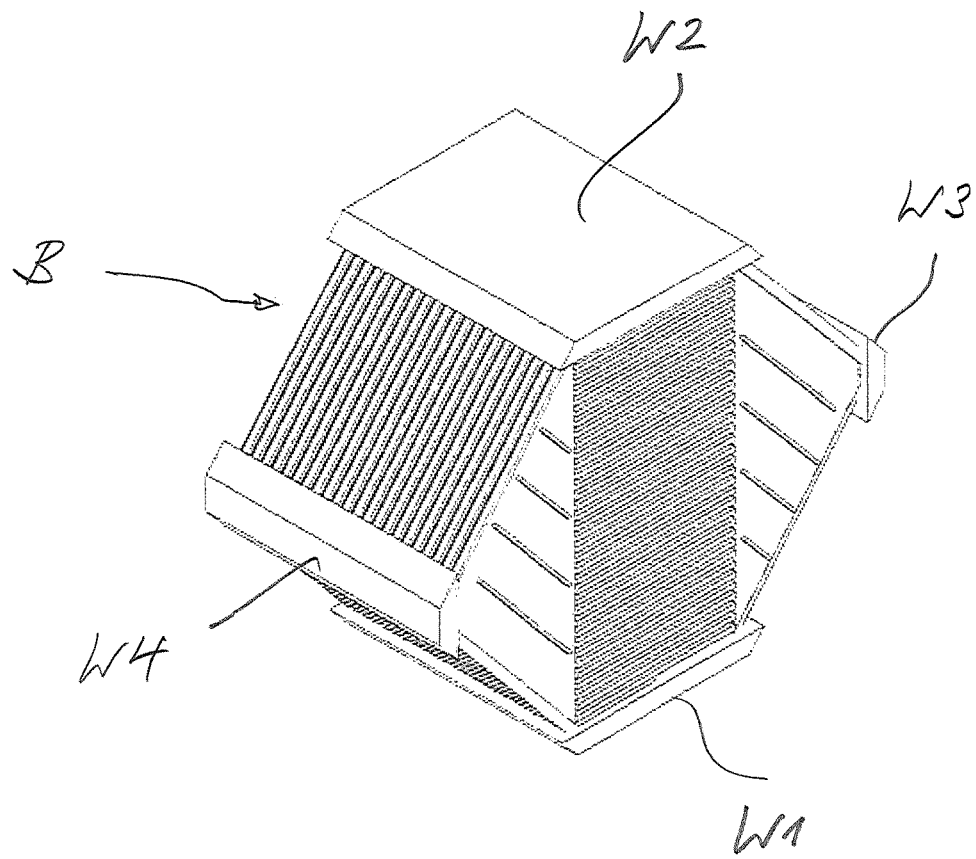
FIG. 7 is a perspective view of said heat exchanger block provided with four housing portions.

FIG. 7 is a perspective view of said heat exchanger block B provided with the four housing portions W1, W2, W3 and W4. The first and second housing portions W1 and W2 are symmetrical to each other and the third and fourth housing portions W3 and W4 are symmetrical and/or identical and/or congruent to each other.

Figure 8:
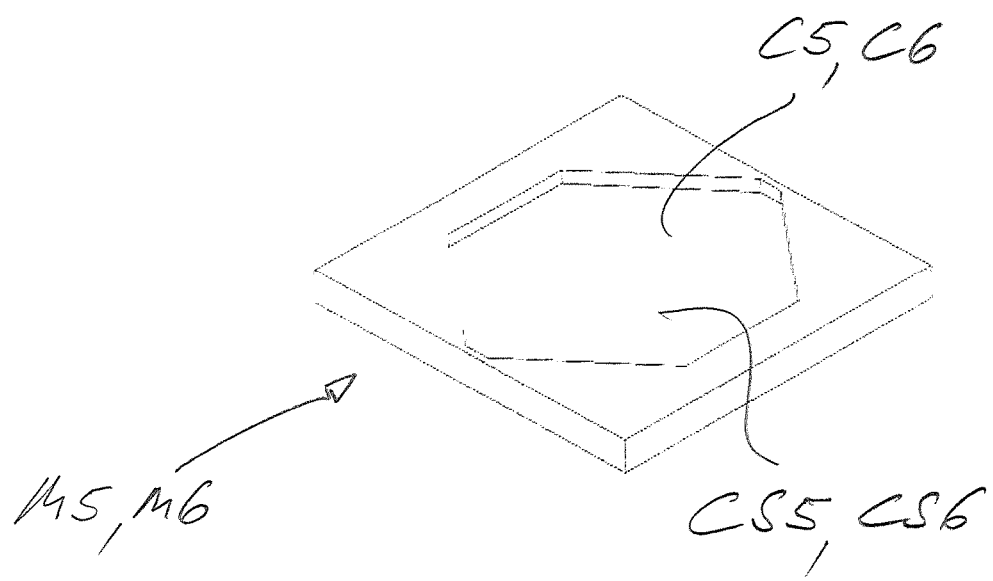
FIG. 8 is a perspective view of a mould to be used in the method according to the embodiment.

FIG. 8 is a perspective view of a fifth mould M5 and a sixth mould M6 to be used in the method according to the embodiment. The fifth and sixth moulds M5 and M6 have a fifth cavity C5 and a sixth cavity C6, respectively with a fifth inner cavity surface CS5 and a sixth inner cavity surface CS6, respectively. In the exemplary embodiment, the heat exchanger block B and the housing H moulded to it are symmetrical with the fifth outer surface region B5 and the sixth outer surface region B6 being symmetrical and/or identical and/or congruent to each other.

Figure 9:
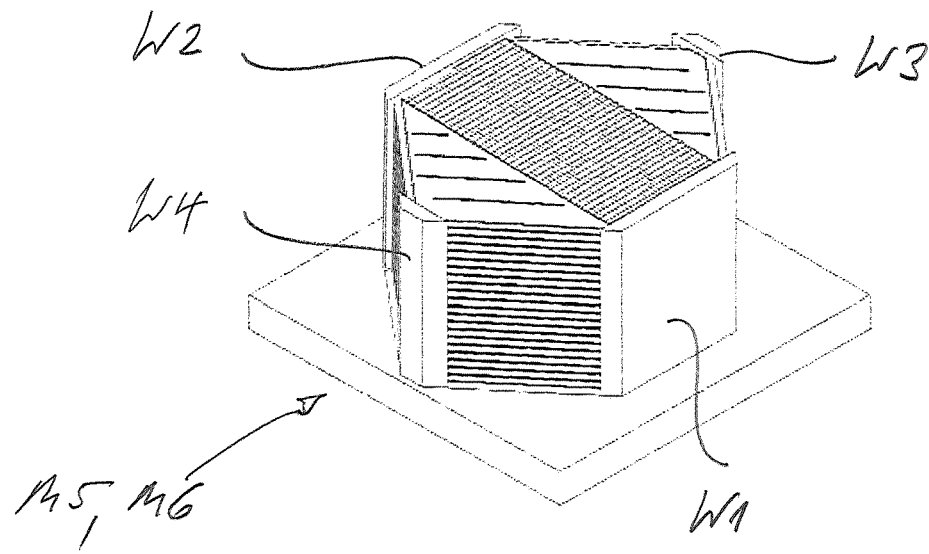
FIG. 9 shows a method step for providing said heat exchanger block with a housing portion.

FIG. 9 shows a method step for providing said heat exchanger block B with a fifth housing portion W5. This method step comprises inserting said fifth outer surface region B5 of said heat exchanger block B into said partially filled fifth cavity portion C5 by moving said heat exchanger block B towards said fifth mould M5, thereby displacing and spreading said fluidic polymer FP within a fifth gap region G5 between said fifth outer surface region B5 and said fifth inner cavity surface CS5. This method step further comprises transferring said fluidic polymer FP within said fifth gap region G5 from its fluidic state into a solid polymer SP with a solid state or less fluidic state than said fluidic polymer. This method step further comprises withdrawing said fifth outer surface region B5 of said heat exchanger block B from said partially filled fifth cavity portion C5 by moving said heat exchanger block B away from said fifth mould M5, thereby leaving said moulded fifth housing portion W5 covering/engaging said fifth outer surface region B5 of said heat exchanger block B.

Figure 10A:
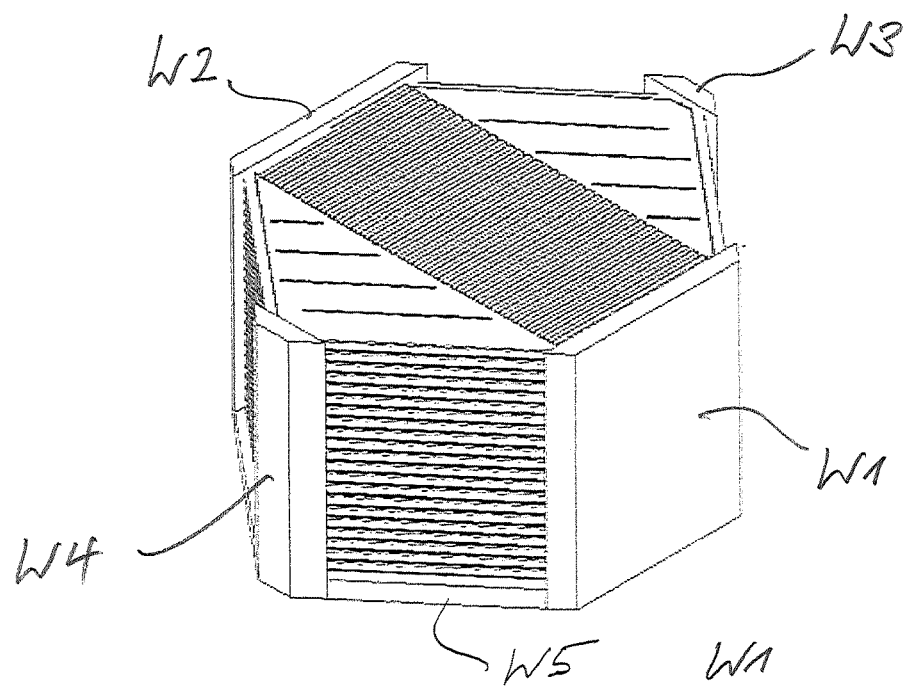
FIG. 10A is perspective view of said heat exchanger block provided with five housing portions.

FIG. 10A is perspective view of said heat exchanger block B provided with said fifth housing portion W5 as result of the method step described in in the previous paragraph with respect to FIG. 9.

Figure 10B:
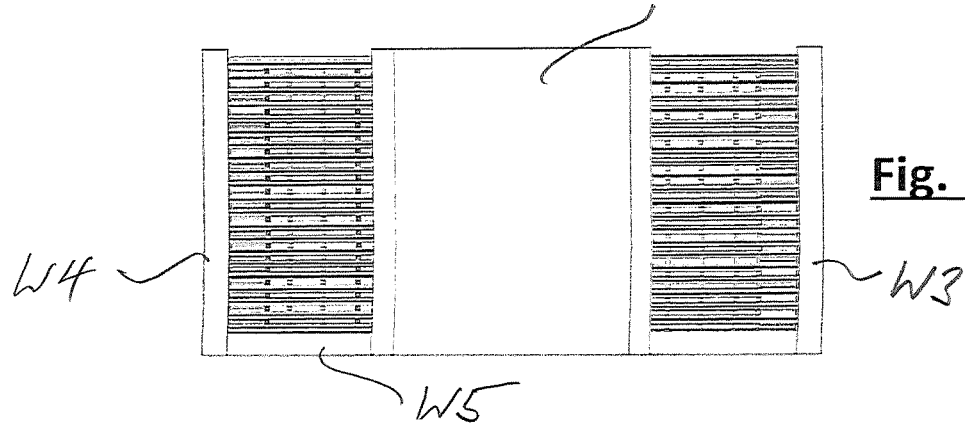
FIG. 10B is a front view of said heat exchanger block provided with said five housing portions.
Figure 11A:
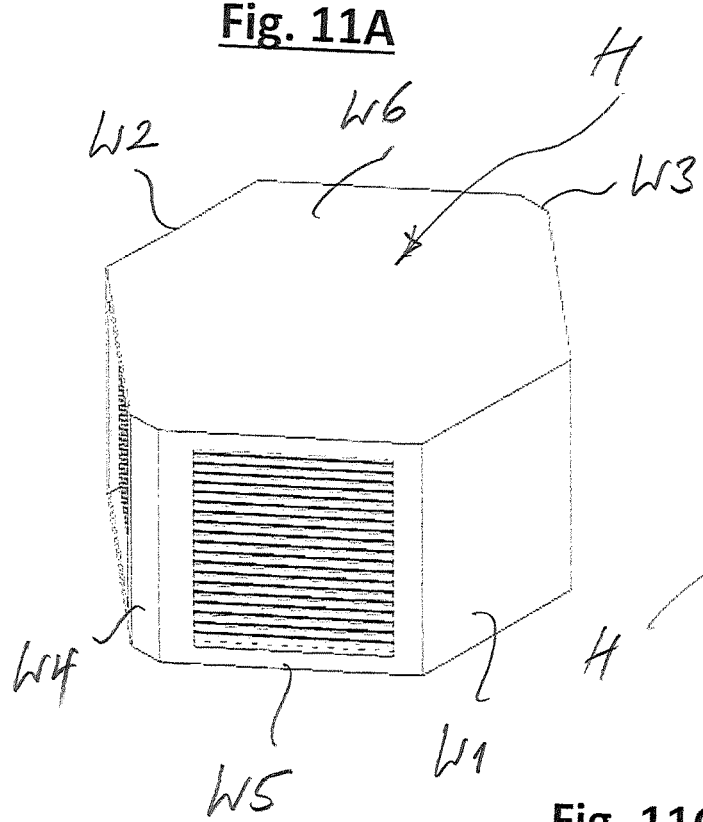
FIG. 11A is a first perspective view of a heat exchanger comprising said heat exchanger block having a housing comprising six housing portions.
Figure 11B:
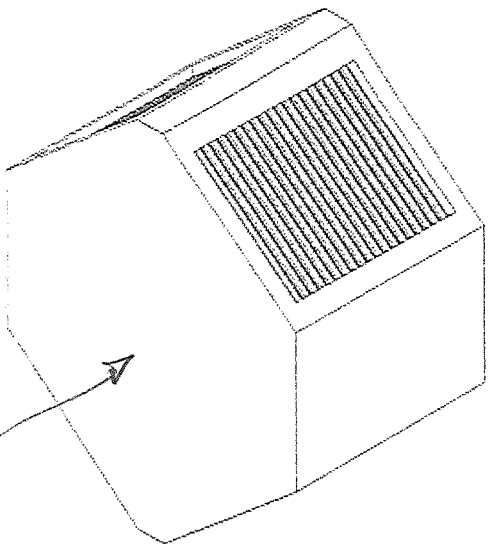
FIG. 11B is a second perspective view of said heat exchanger comprising said heat exchanger block having said housing comprising six housing portions.
Figure 11C:
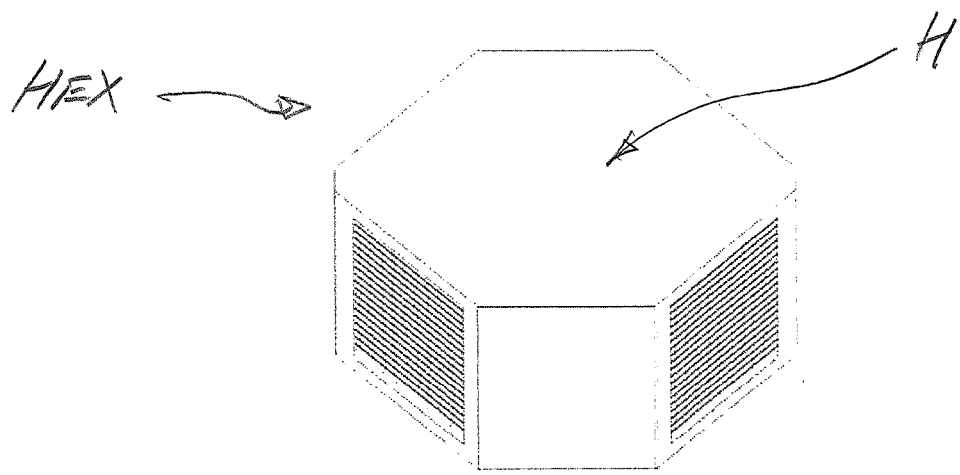
FIG. 11C is a third perspective view of said heat exchanger comprising said heat exchanger block having said housing comprising six housing portions.

FIG. 10B is a side view of said heat exchanger block B provided with said housing portion W5.

Analogously, there is provided a method step for providing said heat exchanger block B with a sixth housing portion W6 (not explicitly shown) This method step comprises inserting said sixth outer surface region B6 of said heat exchanger block B into said partially filled sixth cavity portion C6 by moving said heat exchanger block B towards said sixth mould M6, thereby displacing and spreading said fluidic polymer FP within a sixth gap region G6 between said sixth outer surface region B6 and said sixth inner cavity surface CS6. This method step further comprises transferring said fluidic polymer FP within said sixth gap region G6 from its fluidic state into a solid polymer SP with a solid state or less fluidic state than said fluidic polymer. This method step further comprises withdrawing said sixth outer surface region B6 of said heat exchanger block B from said partially filled sixth cavity portion C6 by moving said heat exchanger block B away from said sixth mould M6, thereby leaving said moulded sixth housing portion W6 covering/engaging said sixth outer surface region B6 of said heat exchanger block B.

List of Reference Signs

B heat exchanger block
H housing of the heat exchanger block

AFP1 first air flow passages
AFP2 second air flow passages
AF1 first air flow
AF2 second air flow
O11 first inlet opening region
O12 first outlet opening region
O21 second inlet opening region
O22 second outlet opening region
B1 first outer surface region
B2 second outer surface region
B3 third outer surface region
B4 fourth outer surface region
B5 fifth outer surface region
B6 sixth outer surface region
W1 first housing portion
WS1 first outer housing surface
W2 second housing portion
WS2 second outer housing surface
W3 third housing portion
WS3 third outer housing surface
W4 fourth housing portion
WS4 fourth outer housing surface
W5 fifth housing portion
WS5 fifth outer housing surface
W6 sixth housing portion
WS6 sixth outer housing surface
H11 first inlet opening
H12 first outlet opening
H21 second inlet opening
H22 second outlet opening
FP fluidic polymer in a fluidic state
SP solid polymer in a solid state or less fluidic state
M1 first mould
C1 first cavity, first recess
CS1 first inner cavity surface
G1 first gap region (between B1 and CS1)
M2 second mould
C2 second cavity, second recess
CS2 second inner cavity surface
G2 second gap region (between B2 and CS2)
M3 third mould
C3 third cavity, third recess
CS3 third inner cavity surface
G3 third gap region (between B3 and CS3)
M4 fourth mould
C4 fourth cavity, fourth recess
CS4 fourth inner cavity surface
G4 fourth gap region (between B4 and CS4)
M5 fifth mould
C5 fifth cavity, fifth recess
CS5 fifth inner cavity surface
G5 fifth gap region (between B5 and CS5)
M6 sixth mould
C6 sixth cavity, sixth recess
CS6 sixth inner cavity surface
G6 sixth gap region (between B6 and CS6)

The invention claimed is:

1. A method for providing a heat exchanger block (B) with a housing (H), said heat exchanger block (B) comprising:
a plurality of first air flow passages (AFP1) and a plurality of second air flow passages (AFP2) adjacent said plurality of first air flow passages for exchanging heat energy between a first air flow (AF1) passing through said plurality of first air flow passages (AFP1) and a second air flow (AF2) passing through said plurality of second air flow passages (AFP2);
a first inlet opening region (O11) having inlet openings for said first air flow (AF1);
a first outlet opening region (O12) having outlet openings for said first air flow (AF1);
a second inlet opening region (O21) having inlet openings for said second air flow (AF2);
a second outlet opening region (O22) having outlet openings for said second air flow (AF2);
a first outer surface region (B1); and
a second outer surface region (B2) opposite said first outer surface region (B1),
said housing (H) comprising:
a first housing portion (W1) covering/engaging said first outer surface region (B1) of said heat exchanger block (B), said first housing portion (W1) having a first outer housing surface (WS1); and
a second housing portion (W2) opposite said first housing portion (W1) and covering/engaging said second outer surface region (B2) of said heat exchanger block (B), said second housing portion (W2) having a second outer housing surface (WS2); and
a first inlet opening (H11) for said first air flow (AF1);
a first outlet opening (H12) for said first air flow (AF1);
a second inlet opening (H21) for said second air flow (AF2);
a second outlet opening (H22) for said second air flow (AF2);
said method comprising the following steps:
a) molding said first housing portion (W1) to said first outer surface region (B1) comprising the following steps:
a1) providing a first mold (M1) having a first cavity (C1) with a first inner cavity surface (CS1) complementary to said first outer housing surface (WS1);
a2) partially filling said first cavity (C1) with a fluidic polymer (FP) in a fluidic state;
a3) inserting said first outer surface region (B1) of said heat exchanger block (B) into said partially filled first cavity portion (C1) by moving said heat exchanger block (B) towards said first-mould mold (M1), thereby displacing and spreading said fluidic polymer (FP) within a first gap region (G1) between said first outer surface region (B1) and said first inner cavity surface (CS1);
a4) transferring said fluidic polymer (FP) within said first gap region (G1) from its fluidic state into a solid polymer (SP) with a solid state or less fluidic state than said fluidic polymer;
a5) withdrawing said first outer surface region (B1) of said heat exchanger block (B) from said partially filled first cavity portion (C1) by moving said heat exchanger block (B) away from said first-mould mold (M1), thereby leaving said molded first housing portion (W1) covering/engaging said first outer surface region (B1) of said heat exchanger block (B); and
b) molding said second housing portion (W2) to said second outer surface region (B2).

2. The method according to claim 1, wherein step b) comprises:
b1) providing a second mold (M2) having a second cavity (C2) with a second inner cavity surface (CS2) complementary to said second outer housing surface (WS2);
b2) partially filling said second cavity (C2) with a fluidic polymer (FP) in a fluidic state;

b3) inserting said second outer surface region (B2) of said heat exchanger block (B) into said partially filled second cavity portion (C2) by moving said heat exchanger block (B) towards said second mold (M2), thereby displacing and spreading said fluidic polymer (FP) within a second gap region (G2) between said second outer surface region (B2) and said second inner cavity surface (CS2);

b4) transferring said fluidic polymer (FP) within said second gap region (G2) from its fluidic state into a solid polymer (SP) with a solid state or less fluidic state than said fluidic polymer; and b5) withdrawing said second outer surface region (B2) of said heat exchanger block (B) from said partially filled second cavity portion (C2) by moving said heat exchanger block (B) away from said second mold (M2), thereby leaving said molded second housing portion (W2) covering/engaging said second outer surface region (B2) of said heat exchanger block (B).

3. The method according to claim 1, wherein said heat exchanger block (B) further comprises:
a third outer surface region (B3); and
a fourth outer surface region (B4) opposite said third outer surface region (B3), said housing (H) further comprising at least:
a third housing portion (W3) covering/engaging said third outer surface region (B3) of said heat exchanger block (B), said third housing portion (W3) having a third outer housing surface (WS3); and
a fourth housing portion (W4) opposite said third housing portion (W3) and covering/engaging said fourth outer surface region (B4) of said heat exchanger block (B), said fourth housing portion (W4) having a fourth outer housing surface (WS4);
said method further comprising the following steps:
c) molding said third housing portion (W3) to said third outer surface region (B3); and
d) molding said fourth housing portion (W4) to said fourth outer surface region (B4).

4. The method according to claim 3, wherein step c) comprises the following steps:
c1) providing a third mold (M3) having a third cavity (C3) with a third inner cavity surface (CS3) complementary to said third outer housing surface (WS3);
c2) partially filling said third cavity (C3) with a fluidic polymer (FP) in a fluidic state;
c3) inserting said third outer surface region (B3) of said heat exchanger block (B) into said partially filled third cavity portion (C3) by moving said heat exchanger block (B) towards said third mold (M3), thereby displacing and spreading said fluidic polymer (FP) within a third gap region (G3) between said third outer surface region (B3) and said third inner cavity surface (CS3);
c4) transferring said fluidic polymer (FP) within said third gap region (G3) from its fluidic state into a solid polymer (SP) with a solid state or less fluidic state than said fluidic polymer;
c5) withdrawing said third outer surface region (B3) of said heat exchanger block (B) from said partially filled third cavity portion (C3) by moving said heat exchanger block (B) away from said third mold (M3), thereby leaving said molded first housing portion (W3) covering/engaging said first outer surface region (B3) of said heat exchanger block (B).

5. The method according to claim 3, wherein step d) comprises the following steps:

d1) providing a fourth mold (M4) having a fourth cavity (C4) with a fourth inner cavity surface (CS4) complementary to said fourth outer housing surface (WS4);

d2) partially filling said fourth cavity (C4) with a fluidic polymer (FP) in a fluidic state;

d3) inserting said fourth outer surface region (B4) of said heat exchanger block (B) into said partially filled forth cavity portion (C4) by moving said heat exchanger block (B) towards said fourth mold (M4), thereby displacing and spreading said fluidic polymer (FP) within a fourth gap region (G4) between said fourth outer surface region (B4) and said fourth inner cavity surface (CS4);

d4) transferring said fluidic polymer (FP) within said fourth gap region (G4) from its fluidic state into a solid polymer (SP) with a solid state or less fluidic state than said fluidic polymer;

d5) withdrawing said fourth outer surface region (B4) of said heat exchanger block (B) from said partially filled fourth cavity portion (C4) by moving said heat exchanger block (B) away from said fourth mold (M4), thereby leaving said molded fourth housing portion (W4) covering/engaging said fourth outer surface region (B4) of said heat exchanger block (8).

6. The method according to claim 3, wherein said third outer surface region (B3) and said fourth outer surface region (B4) have a same shape, and wherein said third housing portion (W3) and said fourth housing portion (W4) have a same shape.

7. The method according to claim 1, wherein the heat exchanger block (B) is a plate heat exchanger comprising a stack of profiled/corrugated heat exchanger plates.

8. The method according to claim 7, wherein said plate heat exchanger comprises heat exchanger plates made from a polymer selected from the group of PS, PVC, PET, and PP.

9. The method according to claim 7, wherein said plate heat exchanger comprises heat exchanger plates made from one of a metal, Al, and an alloy comprising Al.

10. The method according to claim 1, wherein the polymer material used for any one of said molding steps (a, b, c, d) is a thermoplastic material, and wherein any one of said solidifying steps (a4, b4, c4, d4) comprises cooling said thermoplastic material.

11. The method according to claim 1, wherein the polymer material used for any one of said molding steps (a, b, c, d) is a cross-linkable material and wherein any one of said solidifying steps (a4, b4, c4, d4) comprises cross-linking said cross-linkable material.

12. The method according to claim 11, wherein said cross-linkable material is one of a thermosetting polymer, PUR, and a vulcanizable polymer.

13. The method according to claim 1, wherein any one of said first outer surface region (B1), second outer surface region (B2), third outer surface region (B3), and fourth outer surface region (B4) of said heat exchanger block (B) comprises formations extending therefrom and enabling positive locking between said heat exchanger block (B) and any one of said first housing portion (W1), second housing portion (W2), third housing portion (W3), and fourth housing portion (W4), respectively, after any one of said molding steps (a, b, c, d), respectively.

14. The method according to claim 1, wherein a release agent (Trennmittel) is applied to any one of said cavities (C1, C2, C3, C4) of any one of said molds (M1, M2, M3, M4) prior to any one of said molding steps (a, b, c, d).

15. The method according to claim 1, wherein said first outer surface region (B1) and said second outer surface region (B2) have a same shape, and wherein said first housing portion (W1) and said second housing portion (W2) have a same shape.

\* \* \* \* \*